US012461210B2

(12) United States Patent
O'Donnell

(10) Patent No.: US 12,461,210 B2
(45) Date of Patent: Nov. 4, 2025

(54) SYSTEMS AND METHODS FOR VEHICLE SENSOR MANAGEMENT

(71) Applicant: Motional AD LLC, Boston, MA (US)

(72) Inventor: Timothy O'Donnell, Waltham, MA (US)

(73) Assignee: Motional AD LLC, Boston, MA (US)

( * ) Notice: Subject to any disclaimer, the term of this patent is extended or adjusted under 35 U.S.C. 154(b) by 836 days.

(21) Appl. No.: 17/540,175

(22) Filed: Dec. 1, 2021

(65) Prior Publication Data
US 2023/0168351 A1    Jun. 1, 2023

(51) Int. Cl.
| G01S 7/497 | (2006.01) |
| G01S 7/40  | (2006.01) |
| B60L 15/20 | (2006.01) |
| B60W 50/02 | (2012.01) |

(52) U.S. Cl.
CPC ............... *G01S 7/497* (2013.01); *G01S 7/40* (2013.01); *B60L 15/2045* (2013.01); *B60W 50/0205* (2013.01); *B60W 2050/0215* (2013.01); *B60W 2420/403* (2013.01); *B60W 2420/408* (2024.01); *B60W 2420/54* (2013.01); *B60W 2520/10* (2013.01); *B60W 2520/12* (2013.01)

(58) Field of Classification Search
CPC .............. B60T 7/22; H02J 1/08; G01S 7/497
See application file for complete search history.

(56) References Cited

U.S. PATENT DOCUMENTS

| 4,079,802 A  * | 3/1978 | Kawata ................. B60T 7/22 701/96 |
| 8,963,698 B2 | 2/2015 | Grossman |
| 10,303,186 B2 | 5/2019 | Wang |
| 2017/0088072 A1 | 3/2017 | Curtis et al. |
| 2021/0197814 A1 | 7/2021 | Ha et al. |
| 2022/0227318 A1* | 7/2022 | Kurokawa ............... H02J 1/08 |

FOREIGN PATENT DOCUMENTS

| CN | 111989724 A | 11/2020 |
| JP | 2005-165752 | 6/2005 |
| JP | 4335651 B2 * | 9/2009 |
| JP | 2021-182173 | 11/2021 |
| KR | 10-2011-0020700 | 3/2011 |

OTHER PUBLICATIONS

[No Author Listed], "SAE: Surface Vehicle Recommended Practice, Taxonomy and Definitions for Terms Related to Driving Automation Systems for On-Road Motor Vehicles," SAE International, Sep. 30, 2016, 30 pages.

* cited by examiner

*Primary Examiner* — Lam S Nguyen
(74) *Attorney, Agent, or Firm* — Fish & Richardson P.C.

(57) ABSTRACT

Provided are methods for managing vehicle sensors, which can include: determining a stopping distance for a vehicle travelling on a route, identifying one or more sensors of the vehicle that have respective detection ranges less than the stopping distance, and upon identifying the one or more sensors, deactivating at least one operation of at least one sensor of the one or more sensors. Systems and computer program products are also provided.

20 Claims, 11 Drawing Sheets

SYSTEMS AND METHODS FOR VEHICLE SENSOR MANAGEMENT

BACKGROUND

Typical autonomous vehicle (AV) systems have a number of different types of vehicle sensors to facilitate operation of the vehicles. The sensors can consume large amounts of power. Battery-driven electric autonomous vehicles can suffer from range degradation from sensors consuming large amounts of energy, some of which may be wasted due to sensor operations that are not used for operation of the vehicles.

DETAILED DESCRIPTION

Figure 1:
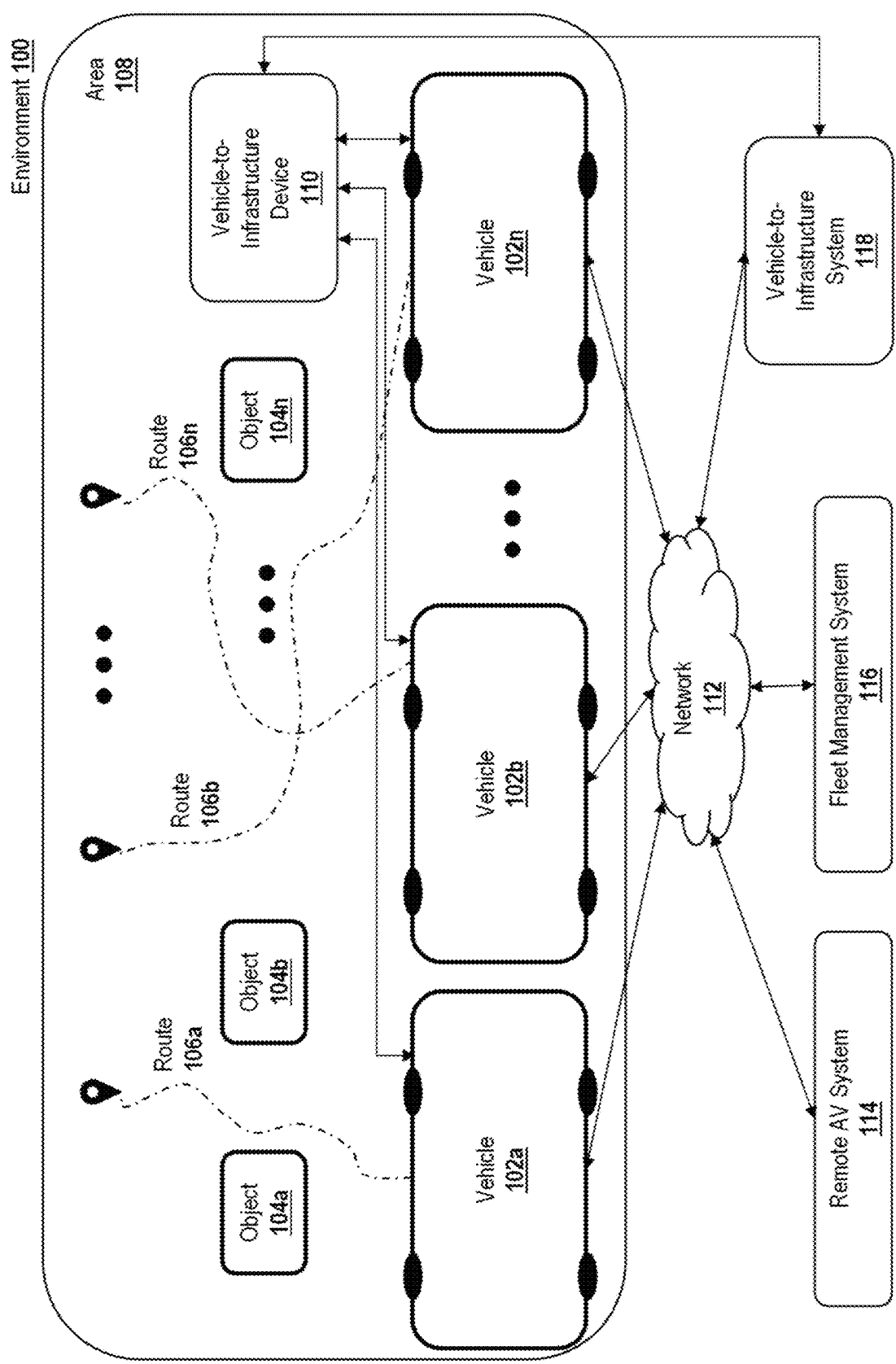
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact. The first contact and the second contact are different contacts.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement vehicle sensor management. A vehicle (e.g., an autonomous vehicle) is configured to manage a number of different types of sensors (e.g., short-range sensors and long-range sensors) for smart power management. Specifically, a control system of the vehicle can deactivate some operations of one or more short-range sensors (e.g., laser firing of short-range LiDAR sensors), or disable the short-range sensors completely (e.g., shut down power to the sensors) during high speed operations (e.g., 40 miles per hour (mph) or greater when driving on a highway road) upon determining that detection ranges (e.g., 0 to 20 feet) of the short-range sensors are shorter than a stopping distance of the vehicle (e.g., 50 or 60 feet) corresponding to the current high speed of movement. The control system can partially or completely deactivate a short-range sensor based on one or more characteristics of the short-range sensor (e.g., priority, startup time, rear/front facing, active/passive). The control system can keep some high-priority short-range sensors fully operational even at high speeds, while deactivating/disabling other short-range sensors. The control system can reactivate or enable short-range sensors during low speed operations (e.g., lower than 40 mph) and/or by determining that a stopping distance of the vehicle is shorter than a distance threshold, e.g., the detection range of the vehicle. The control system keeps long-range sensors, which have a detection range (e.g., 20 to 1000 feet) greater than the stopping distance, operational. The control system can prioritize provision of energy and/or computing resources for higher priority tasks among the long-range sensors (e.g., processing long-range sensor data or improving response times).

By virtue of the implementation of systems, methods, and computer program products described herein, techniques for managing autonomous driving behaviors have some advantages as follows. First, the techniques can reduce power usage (e.g., energy power and/or computing power) of a vehicle (e.g., a battery driven electric autonomous vehicle) by deactivating particular sensors (e.g., short-range sensors) that are not used during certain operations (e.g., high-speed operations), which can reduce energy consumption by the vehicle. Second, the techniques can increase driving ranges and/or battery lifetimes of the vehicle by disabling unnecessary sensors to save energy consumption. Third, the techniques can reprioritize computing resources (e.g., central processing unit (CPU) processing power) to high-priority long-range sensors to improve the performance (e.g., shortening a response time and processing a large amount of long-range sensor data). Fourth, the techniques can determine whether a sensor cannot be used for high-speed operations by determining whether a stopping distance of the vehicle exceeds a detection range of the sensor, which can efficiently improve sensor classification and management.

System Overview

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
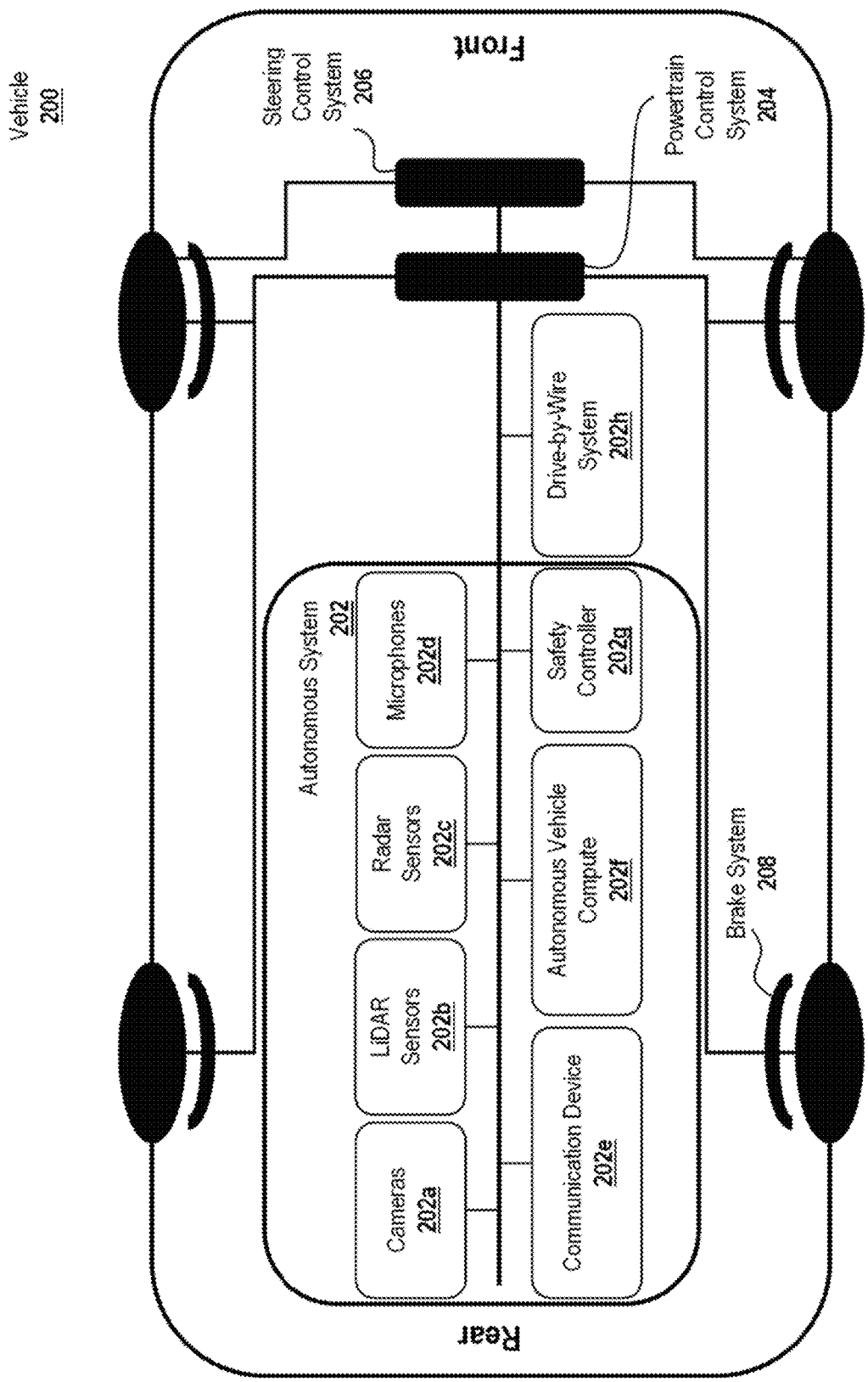
FIG. 2 is a diagram of one or more systems of a vehicle including an autonomous system.

Referring now to FIG. 2, vehicle 200 includes autonomous system 202, powertrain control system 204, steering control system 408, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
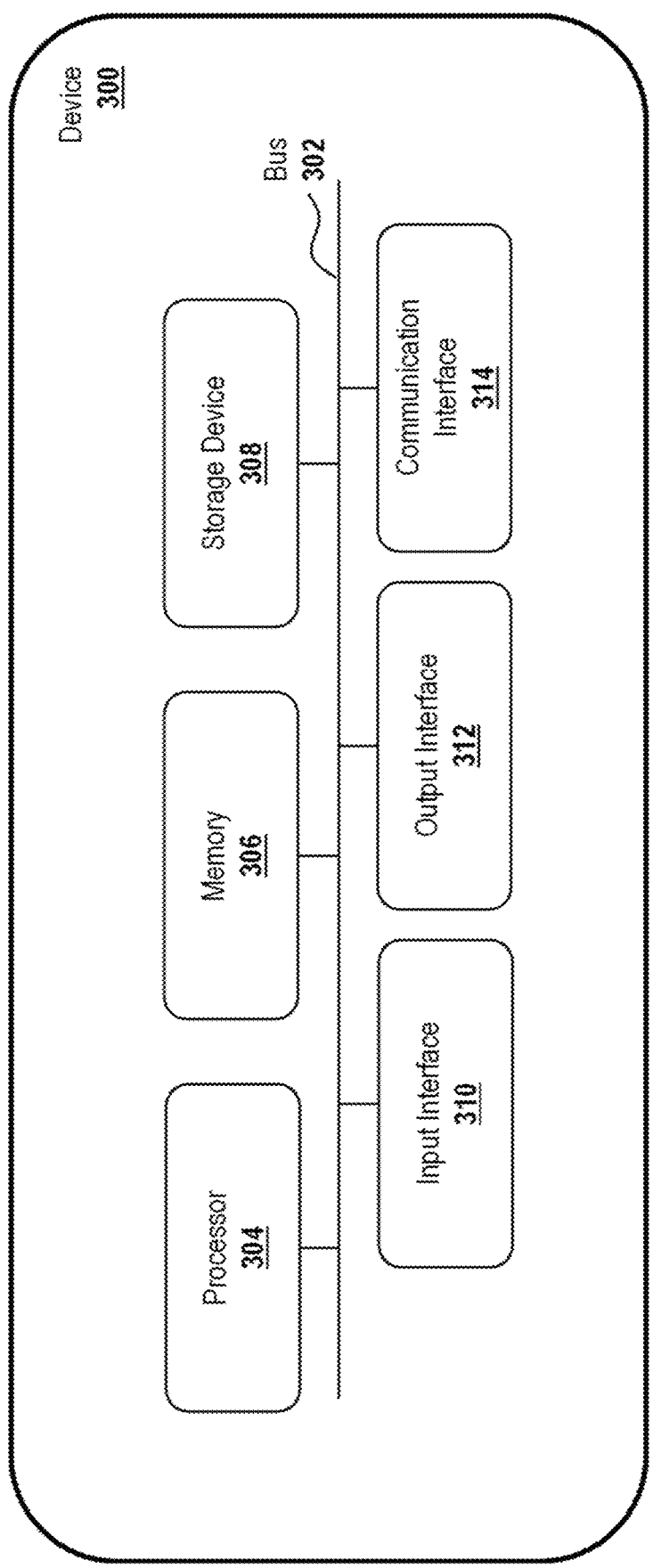
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information.

In some embodiments, camera 202a generates traffic light detection (TLD) data (or traffic light data) associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud in two-dimensions (2D) or three-dimensions (3D), and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b. The image can be a 2D image or 3D image. The LiDAR sensors 202b can provide a 2D or 3D position of the objects. As discussed with further details below and illustrated in FIG. 8B, the LiDAR sensors 202b can include short-range LiDAR sensors 202b-S and/or long-range LiDAR sensors 202b-L.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c. The image can be a 2D image or 3D image. The radar sensors 202c can provide a 2D or 3D position and velocity of the objects.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position and/or type of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 408, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 408, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 408 includes at least one device configured to rotate one or more wheels of vehicle 200. In some examples, steering control system 408 includes at least one controller, actuator, and/or the like. In some embodiments, steering control system 408 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Autonomous Vehicle Architecture

Figure 4:
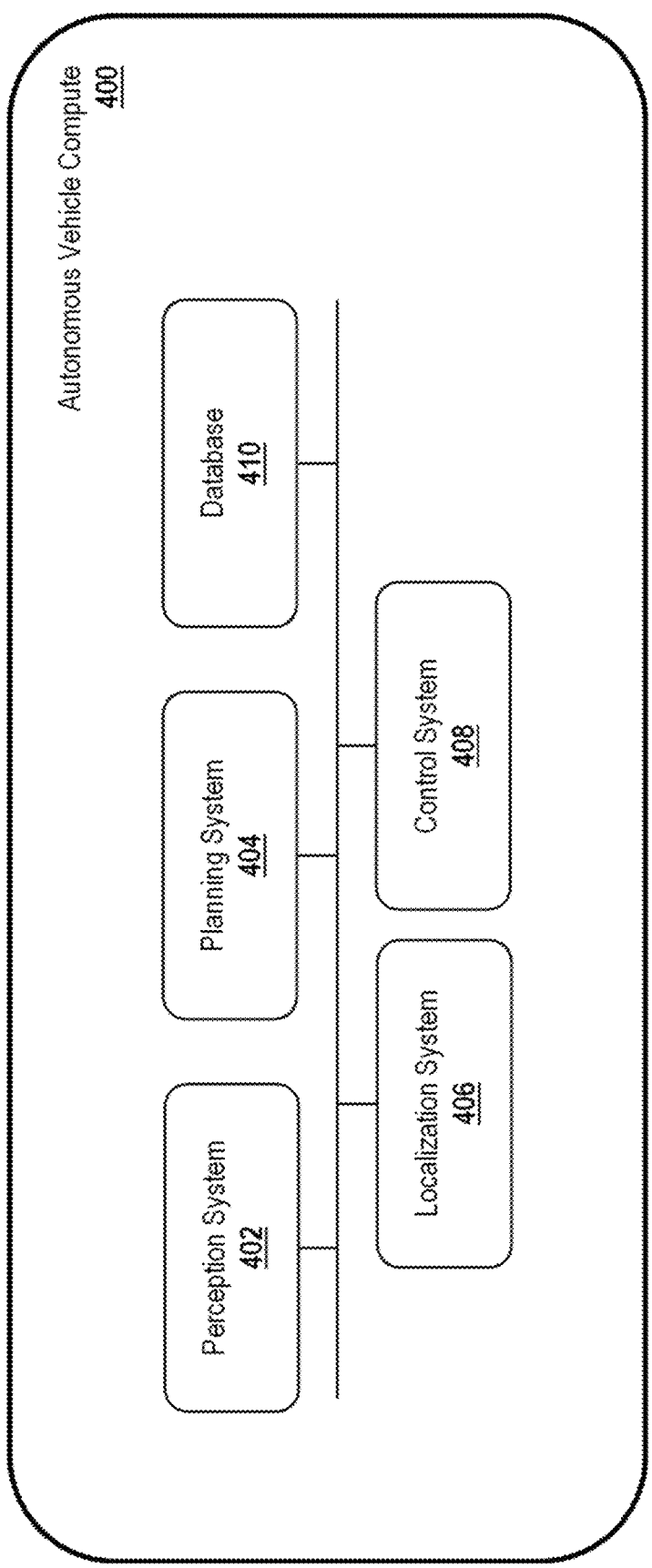
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments, perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 408), and/or a brake system (e.g., brake system 208) to operate. In an example, where a trajectory includes a left turn, control system 408 transmits a control signal to cause steering control system 408 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

LiDAR System

Figure 5:
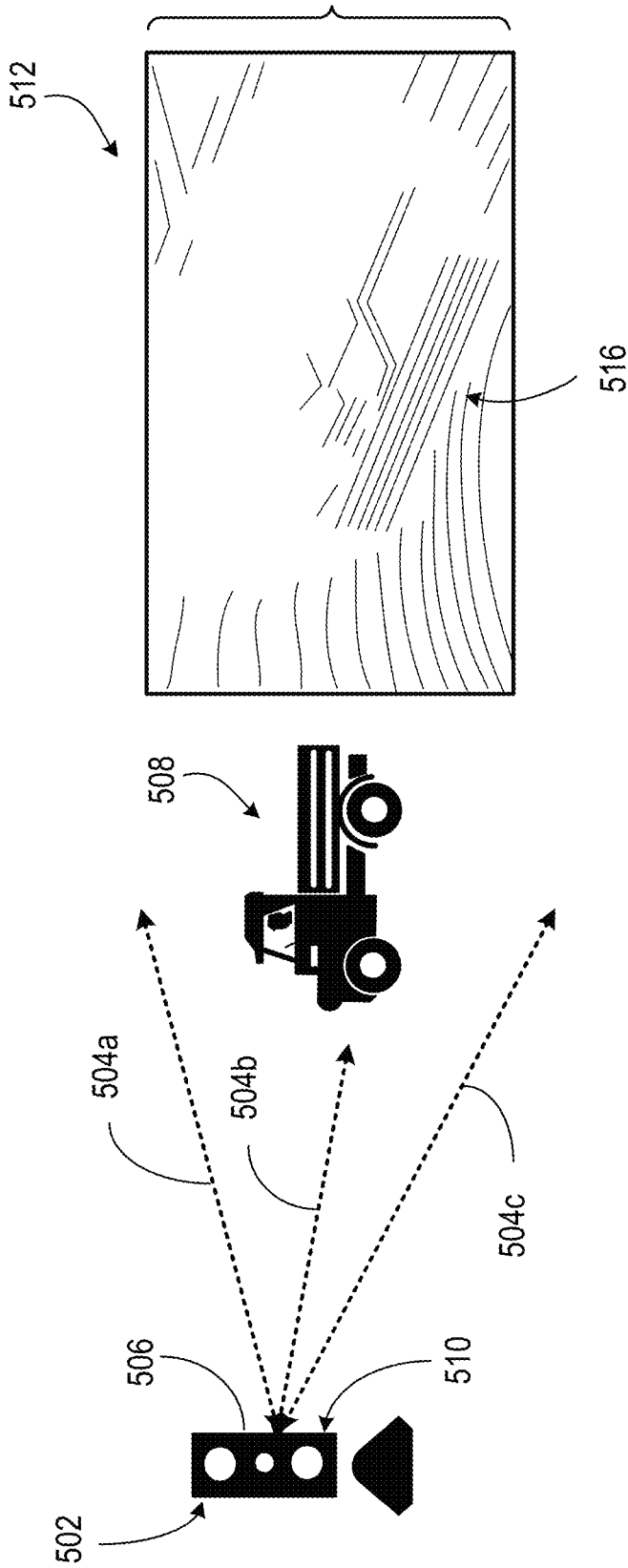
FIG. 5 shows an example of a LiDAR system.

FIG. 5 shows an example of a LiDAR system 502 (e.g., the LiDAR sensors 202b shown in FIG. 2). The LiDAR system 502 emits light 504a-c from a light emitter 506 (e.g., a laser transmitter). Light emitted by a LiDAR system is typically not in the visible spectrum; for example, infrared light is often used. Some of the light 504b emitted encounters a physical object 508 (e.g., a vehicle) and reflects back to the LiDAR system 502. (Light emitted from a LiDAR system typically does not penetrate physical objects, e.g., physical objects in solid form.) The LiDAR system 502 also has one or more light detectors 510, which detect the reflected light. In an embodiment, one or more data processing systems associated with the LiDAR system generates an image 512 representing the field of view 514 of the LiDAR system. The image 512 includes information that represents the boundaries 516 of a physical object 508. In this way, the image 512 is used to determine the boundaries 516 of one or more physical objects near an AV.

Figure 6:
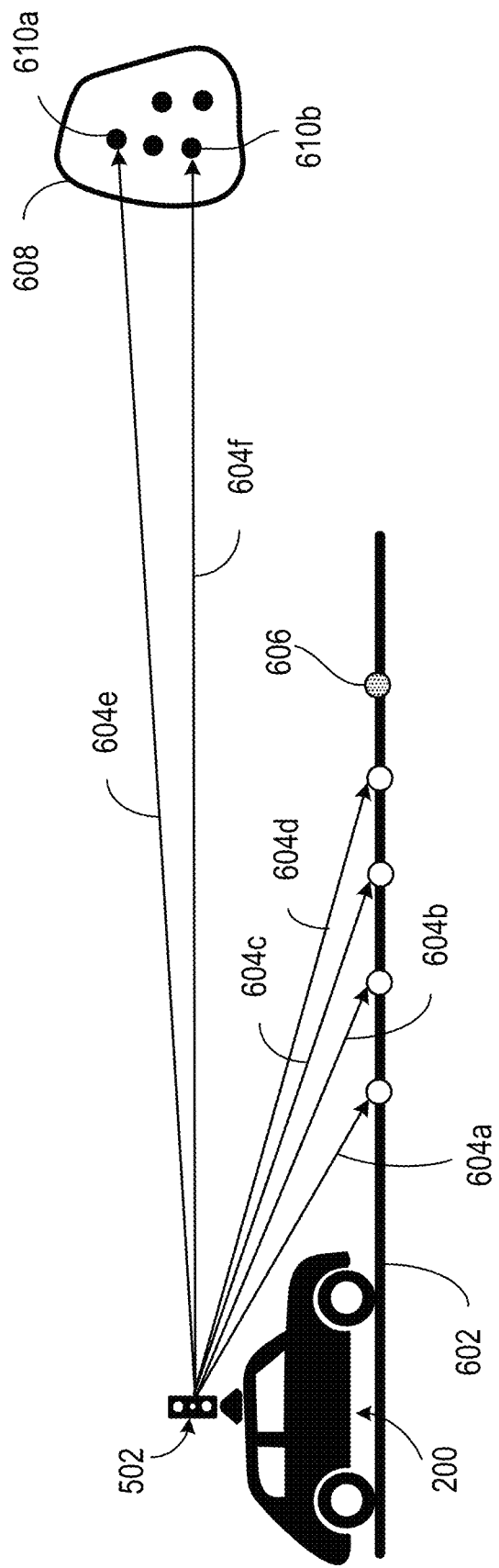
FIG. 6 shows an operation of the LiDAR system.

FIG. 6 shows the operation of the LiDAR system 502 in additional detail. As described above, the vehicle 200 detects the boundary of a physical object based on characteristics of the data points detected by the LiDAR system 502. As shown in FIG. 6, a flat object, such as the ground 602, will reflect light 604a-d emitted from a LiDAR system 502 in a consistent manner. Put another way, because the LiDAR system 502 emits light using consistent spacing, the ground 602 will reflect light back to the LiDAR system 502 with the same consistent spacing. As the vehicle 200 travels over the ground 602, the LiDAR system 502 will continue to detect light reflected by the next valid ground point 606 if nothing is obstructing the road. However, if an object 608 obstructs the road, light 604e-f emitted by the LiDAR system 502 will be reflected from points 610a-b in a manner inconsistent with the expected consistent manner. From this information, the vehicle 200 can determine that the object 608 is present.

Autonomous Vehicle Control

Figure 7:
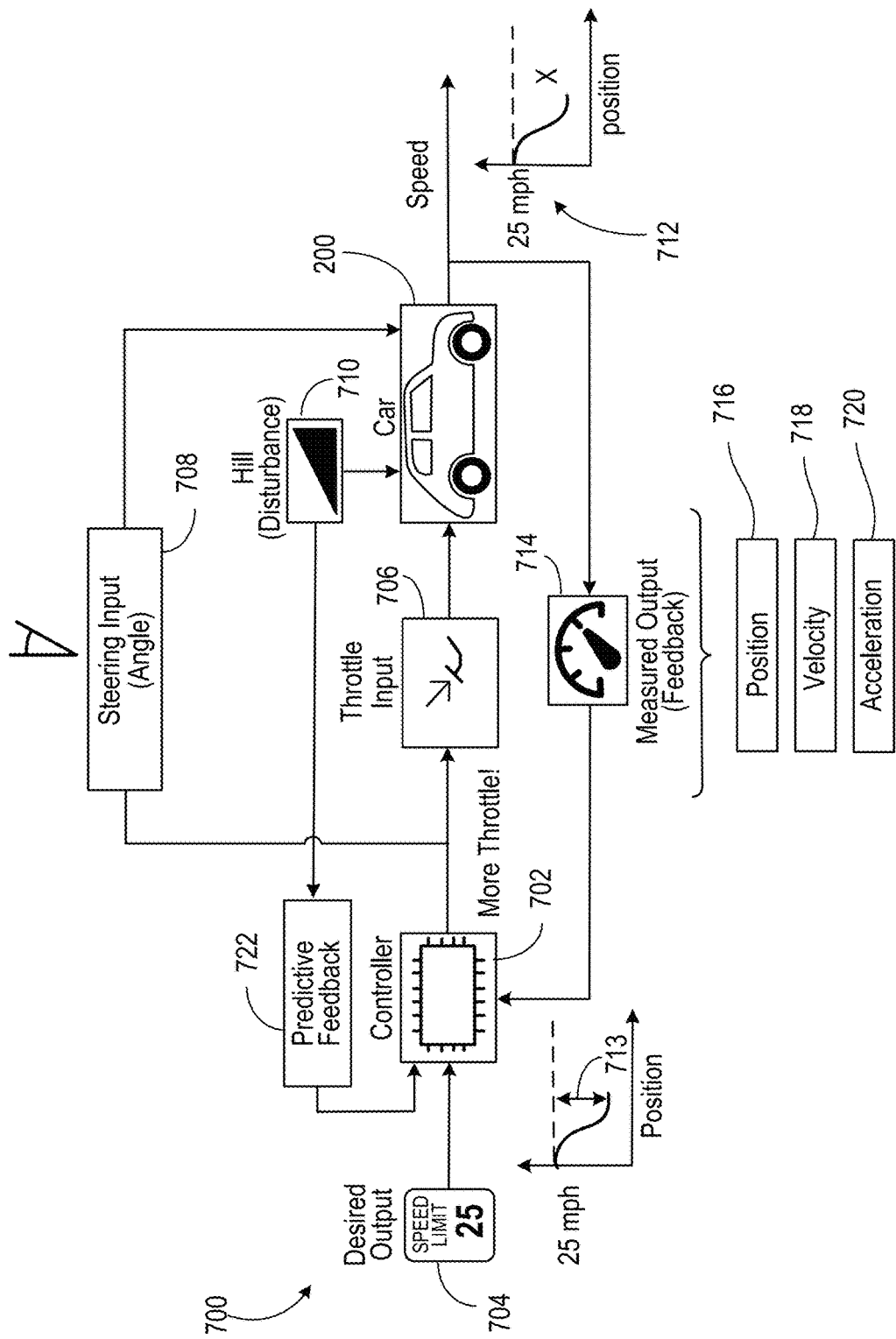
FIG. 7 shows a block diagram of a control system.

FIG. 7 shows a block diagram 700 of the inputs and outputs of a control system 408 (e.g., as shown in FIG. 4). A control system operates in accordance with a controller 702 which includes, for example, one or more processors (e.g., one or more computer processors such as microprocessors or microcontrollers or both), short-term and/or long-term data storage (e.g., memory random-access memory or flash memory or both), ROM, and storage device, and instructions stored in memory that carry out operations of the controller 702 when the instructions are executed (e.g., by the one or more processors).

In an embodiment, the controller 702 receives data representing a desired output 704. The desired output 704 typically includes a velocity, e.g., a speed and a heading. The desired output 704 can be based on, for example, data received from a planning system 404 (e.g., as shown in FIG. 4). In accordance with the desired output 704, the controller 702 produces data usable as a throttle input 706 and a steering input 708. The throttle input 706 represents the magnitude in which to engage the throttle (e.g., acceleration control) of a vehicle 200, e.g., by engaging the steering pedal, or engaging another throttle control, to achieve the desired output 704. In some examples, the throttle input 706 also includes data usable to engage the brake (e.g., deceleration control) of the vehicle 200. The steering input 708 represents a steering angle, e.g., the angle at which the steering control (e.g., steering wheel, steering angle actuator, or other functionality for controlling steering angle) of the AV should be positioned to achieve the desired output 704.

In an embodiment, the controller 702 receives feedback that is used in adjusting the inputs provided to the throttle and steering. For example, if the vehicle 200 encounters a disturbance 710, such as a hill, the measured speed 712 of the vehicle 200 is lowered below the desired output speed. In an embodiment, any measured output 714 is provided to the controller 702 so that the necessary adjustments are performed, e.g., based on the differential 713 between the measured speed and desired output. The measured output 714 includes a measured position 716, a measured velocity 718 (including speed and heading), a measured acceleration 720, and other outputs measurable by sensors of the vehicle 200.

In an embodiment, information about the disturbance 710 is detected in advance, e.g., by a sensor such as a camera, LiDAR, or RADAR sensor, and provided to a predictive feedback module 722. The predictive feedback module 722 then provides information to the controller 702 that the controller 702 can use to adjust accordingly. For example, if the sensors of the vehicle 200 detect ("see") a hill, this information can be used by the controller 702 to prepare to engage the throttle at the appropriate time to avoid significant deceleration.

Figure 8A:
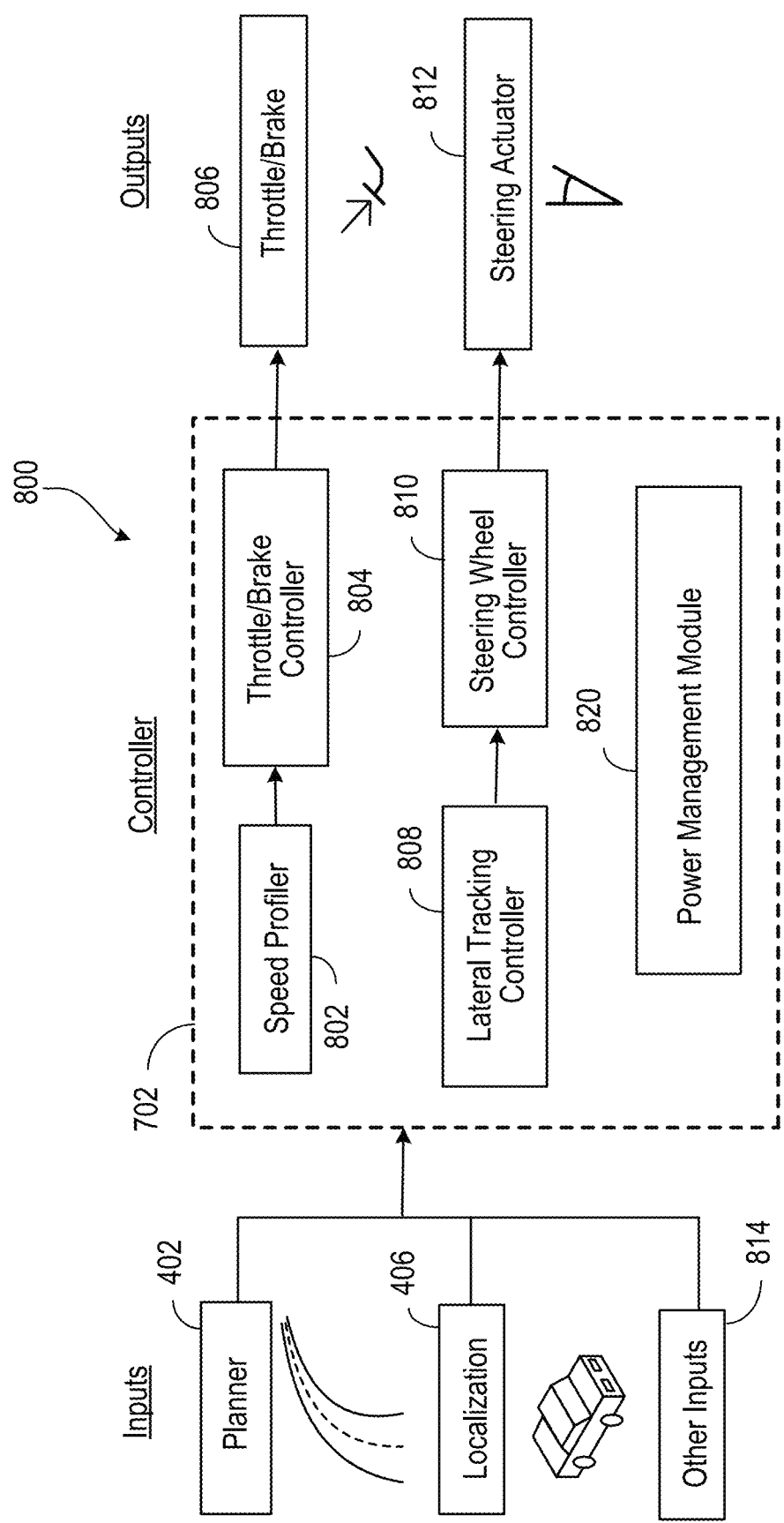
FIG. 8A shows a block diagram of a controller including a power management module.

FIG. 8A shows a block diagram 800 of the inputs, outputs, and components of the controller 702. The controller 702 has a speed profiler 802 which affects the operation of a throttle/brake controller 804. For example, the speed profiler 802 instructs the throttle/brake controller 804 to engage acceleration or engage deceleration using the throttle/brake 806 depending on, e.g., feedback received by the controller 702 and processed by the speed profiler 802.

The controller 702 also has a lateral tracking controller 808 which affects the operation of a steering controller 810. For example, the lateral tracking controller 808 instructs the steering controller 810 to adjust the position of the steering angle actuator 812 depending on, e.g., feedback received by the controller 702 and processed by the lateral tracking controller 808.

The controller 702 receives several inputs used to determine how to control the throttle/brake 806 and steering angle actuator 812. A planning system 404 provides information used by the controller 702, for example, to choose a heading when the vehicle 200 begins operation and to determine which road segment to traverse when the vehicle 200 reaches an intersection. A localization system 406 provides information to the controller 702 describing the current location of the vehicle 200, for example, so that the controller 702 can determine if the vehicle 200 is at a location expected based on the manner in which the throttle/brake 806 and steering angle actuator 812 are being controlled. In an embodiment, the controller 702 receives information from other inputs 814, e.g., information received from databases, computer networks, etc.

The vehicle 200 has a power management module 820 which manages energy resources and/or computing resources for sensors of the vehicle 200 for operation of the vehicle 200. In one embodiment, as illustrated in FIG. 8A, the power management module 820 is included in the controller 702. In one embodiment, the power management module 820 is external to the controller 702, e.g., included in the autonomous system 202 of FIG. 2 or the autonomous vehicle computer 400 of FIG. 4.

The vehicle 200 includes a number of sensors, e.g., the sensors 121 as shown in FIG. 1. The sensors can include sensors for sensing or measuring properties of the vehicle 200's environment, e.g., cameras 202a, LiDAR 202b, RADAR 202c, microphones 202d, traffic light detection (TLD) system, ultrasonic sensors, time-of-flight (TOF) depth sensors, and speed sensors.

Figure 8B:
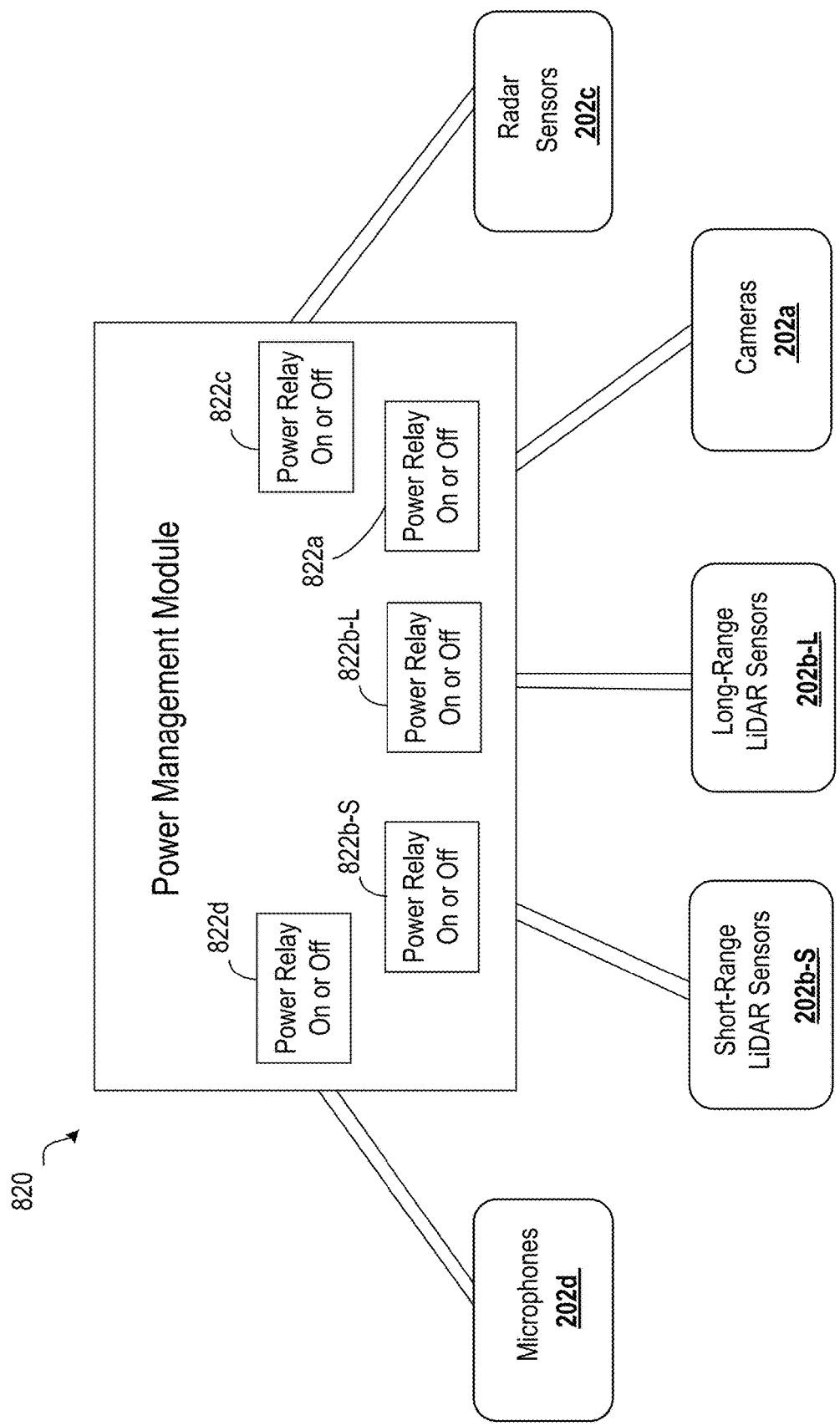
FIG. 8B shows a diagram of a power management module coupled to multiple sensors.

The sensors can be categorized into different groups/types of sensors based on one or more properties or characteristics of the sensors. The one or more properties or characteristics include priority of output data of the sensors, priority of the sensors, startup time of the sensors, rear/front facing of the sensors, active/passive sensors, detection ranges of the sensors, and applicable operations of the sensors (e.g., high speed or low speed operation). As illustrated in FIG. 8B, a LiDAR sensor 202b can be a short-range LiDAR sensor 202b-S or a long-range LiDAR sensor 202b-L.

FIG. 8B shows the power management module 820 coupled to a number of sensors, e.g., cameras 202a, short-range LiDAR sensors 202b-S, long-range LiDAR sensors 202b-L, RADAR 202c, and microphones 202d. The power management module 820 is configured to manage energy resources and/or computing resources for the sensors using the properties or characteristics of the sensors. As illustrated in FIG. 8B, the power management module 820 includes a number of power relay components, e.g., 822a, 822b-S, 822b-L, 822c, 822d, each of which is coupled to a corresponding sensor, e.g., 202a, 202b-S, 202b-L, 202c, 202d, and configured to power on or off the corresponding sensor.

The power management module 820 distributes computing resources, e.g., CPU, graphics processing unit (GPU) or field-programmable gate array (FPGA) processing power, among the sensors. For example, output data of the sensors are provided to other systems of the vehicle 200, e.g., the perception system 402, the planning system 404, the control system 408, and/or the database 410. The output data of the sensors can be processed separately or collectively. In an embodiment, processing output data from a first sensor has a higher priority than processing output data from a second sensor or other sensors of the vehicle 200. The power management module 820 can distribute more computing resources to the first sensor than to the second sensor or other sensors using different priority levels of the sensors.

The power management module 820 manages energy resources, e.g., energy power, for the sensors. The power management module 820 can activate/deactivate some operations of a sensor, e.g., laser firing of a LiDAR sensor, or enable/disable a sensor completely, e.g., turn on/shut down energy power to the sensor. The energy power can be an electric power provided by one or more batteries.

The sensors consume large amounts of energy and/or computing power, some of which are wasted for unnecessary sensor operations. As discussed with further details below, the power management module 820 is configured to manage the sensors for smart power management. Specifically, the power management module 820 deactivates some operations of one or more short-range sensors or disables the short-range sensors completely during high speed operations upon determining that detection ranges of the short-range sensors are shorter than a stopping distance of the vehicle 200. Meanwhile, the power management module 820 keeps operational long-range sensors that have a detection range greater than the stopping distance. As the one or more short-range sensors are partially or completely disabled, more resources become available. The power management module 820 can prioritize energy and/or computing resources for higher priority tasks among the sensors. The power management module 820 reactivates or enables short-range sensors during low speed operations and/or by determining that a stopping distance of the vehicle 200 is shorter than a distance threshold, e.g., the detection range of the vehicle 200. In such a way, the power management module 820 reduces energy consumption by the short-range sensors, increases driving ranges and/or battery lifetimes of the vehicle 200, and improves the performance of the vehicle 200 (e.g., shortening a response time of a higher priority sensor and processing a large amount of long-range sensor data).

The sensors can be categorized into rear facing sensors and front facing sensors. The rear facing sensors are configured to monitor an environment behind or around the vehicle 200, while the front facing sensors are configured to monitor an environment in front of or around the vehicle 200. The rear facing sensors can be short-range sensors, while the front facing sensors can be short-range sensors or long-range sensors. The power management module 820 is configured to power on the rear facing sensors and power off the front facing sensors during rearward (or backward) driving. The power management module 820 is configured to power off the rear facing sensors and power on the front facing sensors during forward driving (e.g., driving on a highway). In such a way, the power management module 820 reduces energy consumption by the front facing sensors during rearward driving and by the rear facing sensors during forward driving.

Figure 9:
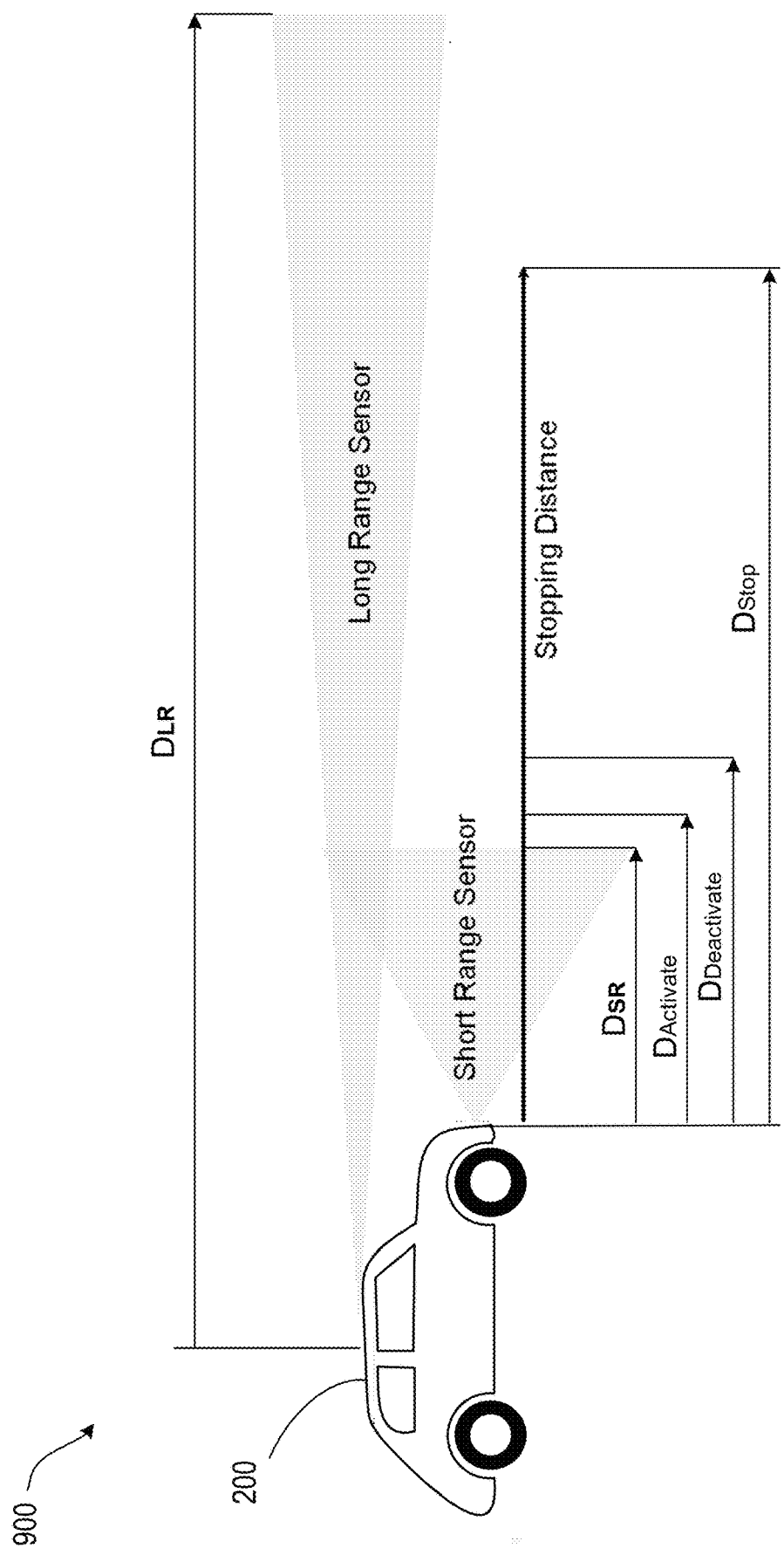
FIG. 9 shows an example of vehicle sensor management using sensor detection ranges and a stopping distance.

FIG. 9 shows an example 900 of vehicle sensor management using sensor detection ranges and a stopping distance for a vehicle 200 travelling on a route. The vehicle 200 has one or more short-range sensors and one or more long-range sensors. In some embodiments, the short-range sensors include one or more of a LiDAR sensor (e.g., 202b of FIG. 2 or 502 of FIG. 5 or 6), a RADAR sensor (e.g., 202c of FIG. 2), a camera sensor (e.g., 202a of FIG. 2), a microphone sensor (e.g., 202d of FIG. 2), an ultrasonic sensor, or a TOF depth sensor. In some embodiments, the long-range sensors include one or more of a LiDAR sensor (e.g., 202b of FIG. 2 or 502 of FIG. 5 or 6), a RADAR sensor (e.g., 202c of FIG. 2), a camera sensor (e.g., 202a of FIG. 2), a microphone sensor (e.g., 202d of FIG. 2), an ultrasonic sensor, or a TOF depth sensor. A short-range sensor and a long-range sensor can be the same type of sensor, e.g., a LiDAR sensor, but with different detection ranges. For illustration purposes only, the techniques are described below with respect to a short-range LiDAR sensor and a long-range LiDAR sensor. However, the techniques are equally applicable to other types of short-range and long-range sensors and/or other combinations of short-range and long-range sensors.

As illustrated in FIG. 9, when the vehicle 200 is travelling on the route, the vehicle 200, e.g., the controller 702 of FIGS. 7 and 8A, determines a stopping distance $D_{Stop}$ for the vehicle 200 to safely stop, e.g., using a driving speed of the vehicle 200, one or more deceleration parameters, or one or more timing parameters. For example, a stopping distance (e.g., 100 feet) for a high driving speed (e.g., more than 40 mph) is greater than a stopping distance (e.g., 30 feet) for a low driving speed (e.g., less than 40 mph).

The vehicle 200 can also determine the stopping distance $D_{Stop}$ using a braking mechanism, e.g., an emergency braking mechanism or a comfort braking mechanism. A stopping distance for a comfort braking of the vehicle 200 is greater than a stopping distance for an emergency braking of the vehicle 200, e.g., for a same driving speed. For example, sensors of the vehicle 200 detect a disturbance (e.g., the disturbance 710 as shown in FIG. 7) in a short distance ahead of the vehicle, and the vehicle 200 can adopt the emergency braking mechanism and stop the vehicle 200 with a higher deceleration than that for the comfort braking mechanism.

As illustrated in FIG. 9, a short-range sensor has a detection range $D_{SR}$, and a long-range sensor has a detection range $D_{LR}$ that is greater than the detection range $D_{SR}$. In an example, the detection range $D_{SR}$ can be within a range from 0 to 20 feet, and the detection range $D_{LR}$ is within a range from 20 feet to 1000 feet. The short-range sensor can be assembled on front of the vehicle 200 and the long-range sensor can be assembled on top of the vehicle 200.

In one embodiment, the vehicle 200 determines whether a sensor is a short-range sensor or a long-range sensor by determining whether a detection range of the sensor is respectively less than or greater than a current stopping distance of the vehicle 200. If the detection range of the sensor is less than the current stopping distance, the vehicle 200 determines that the sensor is a short-range sensor. If the detection range of the sensor is equal to or greater than the current stopping distance, the vehicle determines that the sensor is a long-range sensor. In one embodiment, a distance threshold is defined to be a result of the current stopping distance minus a buffer distance. If a detection range of a sensor is less than the distance threshold, the vehicle 200 determines that the sensor is a short-range sensor. If a detection range of a sensor is equal to or greater than the distance threshold, the vehicle 200 determines that the sensor is a long-range sensor.

The vehicle 200 can dynamically determine the stopping distance $D_{Stop}$ for the vehicle 200, identify short-range sensors and long-range sensors among vehicle sensors, and then manage the vehicle sensors based on the identification of the short-range sensors and the long-range sensors.

In some cases, during a high speed operation of the vehicle 200, e.g., driving on a highway road, the vehicle 200 is configured not to detect the vehicle's environment within a distance that is less than the current stopping distance of the vehicle 200. In such cases, a short-range sensor having a detection range $D_{SR}$ less than a distance threshold, e.g., the stopping distance $D_{Stop}$, is not used for operation of the vehicle 200. The vehicle 200, e.g., the power management module 820 as shown in FIGS. 8A and 8B, can manage power for the short-range sensor in one or more ways. When the short-range sensor is useful for operation of the vehicle 200, e.g., when the detection range of the short-range sensor $D_{SR}$ is equal to or greater than a current stopping distance $D_{Stop}$ of the vehicle or when a driving speed of the vehicle is less than a speed threshold (e.g., 40 mph), the vehicle can reactivate the short-range sensor for operation.

In one embodiment, the vehicle 200 partially deactivates the short-range sensors, e.g., by deactivating one or more operations of the short-range sensor or ceasing provision of computing resources to one or more components of the short-range sensor. In an example, the vehicle 200 deactivates laser firing for a short-range LiDAR sensor, e.g., by turning off power for laser emission and detection. Some computing resources, e.g., CPUs and/or FPGAs, may still run. In this way, the short-range sensor can be quickly deactivated to save energy and computing resources and also be quickly reactivated for operation.

In one embodiment, the vehicle 200 disables the short-range sensor completely, e.g., by turning off or stopping power to the short-range sensor. In this way, all of the energy power and computing resources for the short-range sensor are saved. The saved energy power and computing resources can be used for higher priority tasks, e.g., for processing long-range sensor data.

The control system can partially or completely deactivate a short-range sensor using one or more characteristics of the short-range sensor (e.g., startup time, priority, rear/front facing, active/passive).

In one embodiment, the vehicle sets a time threshold (e.g., 3 seconds) for the short-range sensor to start up or restart. The vehicle determines whether a startup time of the short-range sensor is greater or less than the time threshold. If the startup time is less than the time threshold, that is, the short-range sensor can be quickly restarted, the vehicle completely deactivates the short-range sensor in response to determining that the short-range sensor is not needed, e.g., by determining that the detection range of the short-range sensor is less than a stopping distance of the vehicle. If the startup time is greater than or equal to the time threshold, that is, the short-range sensor cannot be quickly restarted, the vehicle partially deactivates the short-range sensor so that the short-range sensor can be quickly restarted for operation.

In one embodiment, the vehicle determines whether a short-range sensor is a passive sensor or an active sensor. For example, a camera sensor is a passive sensor that just detects information, while a LiDAR sensor is an active sensor that generates laser light and detects reflected/diffracted light for detection of information. The vehicle can partially deactivate a short-range sensor in response to determining that the short-range sensor is an active sensor so that the short-range sensor can be quickly restarted for operation or keep running for some tasks, e.g., for particular driving conditions like night driving. In contrast, the vehicle can completely deactivate a short-range sensor in response to determining that the short-range sensor is a passive sensor, e.g., during particular driving conditions like night driving.

In one embodiment, the vehicle determines whether a short-range sensor is a low-priority sensor or a high-priority sensor. A high-priority sensor (e.g., a LiDAR sensor) is more important for operation of the vehicle than a low-priority sensor (e.g., an ultrasonic sensor). Depending on the priority level, the vehicle can deactivate the high-priority sensor partially, so that the high-priority sensor can be quickly reactivated for operation or kept running for some tasks. In contrast, the vehicle can completely deactivate a short-range sensor in response to determining that the short-range sensor is a low-priority sensor.

The vehicle can add some buffering distance or time for deactivating a short-range sensor. As illustrated in FIG. 9, the vehicle can determine a deactivation distance threshold $D_{Deactivate}$ for a short-range sensor that is greater than a detection range of the short-range sensor $D_{SR}$. In response to determining that a current stopping distance $D_{Stop}$ of the vehicle is greater than the deactivation distance threshold $D_{Deactivate}$, the vehicle can deactivate at least one operation of the short-range sensor.

The vehicle can also add some buffering distance or time for reactivating a short-range sensor. As illustrated in FIG. 9, the vehicle can determine an activation distance threshold $D_{Activate}$ for a short-range sensor that is greater than a detection range of the short-range sensor $D_{SR}$. In response to determining that a current stopping distance $D_{Stop}$ of the vehicle is less than the activation distance threshold $D_{Activate}$, the vehicle can reactivate the short-range sensor for operation. The vehicle can determine the deactivation distance threshold $D_{Deactivate}$ and the activation distance threshold $D_{Activate}$ using one or more properties of the short-range sensor (e.g., response time, and/or startup time). The deactivation distance threshold $D_{Deactivate}$ can be greater than the activation distance threshold $D_{Activate}$.

As noted above, during a high speed operation of the vehicle 200, the vehicle 200 can identify one or more short-range sensors that each have a detection range less than a stopping distance of the vehicle and deactivate (partially or completely) at least one of the one or more short-range sensors. The vehicle 200 can keep high-priority short-range sensors fully operational even at the high speed operation, while deactivating other short-range sensors. For a long-range sensor having a detection range (e.g., 20 to 1000 feet) greater than the stopping distance, the vehicle 200 maintains an operation of the long-range sensor. Upon deactivation of one or more short-range sensors, the vehicle 200 has more energy or computing resources available for sensors in operation, including one or more long-range sensors and/or one or more high-priority short-range sensors. For example, the vehicle 200 can prioritize the sensors in operation and allocate more computing power for a long-range sensor having a priority level higher than one or more other sensors.

In one embodiment, during low speed operation of the vehicle 200, e.g., driving in a local road, the vehicle 200 identifies one or more long-range sensors that each have a detection range substantially greater (e.g., 2, 5 or 10 times or more) than a current stopping distance, which may not be useful for the low speed operation. The vehicle 200 can deactivate partially or completely at least one of the one or more long-range sensors to save energy usage or computing resources. The vehicle 200 can then redistribute energy and/or computing resources among sensors in operation and allocate more power to high priority tasks, e.g., processing a large amount of short-range sensor data. The vehicle 200 can also reactivate a deactivated long-range sensor, e.g., when determining a driving speed of the vehicle is greater than a speed threshold and/or the detection range of the long-range sensor is not substantially greater than a current stopping distance.

Processes for Implementing Vehicle Sensor Management

Figure 10:
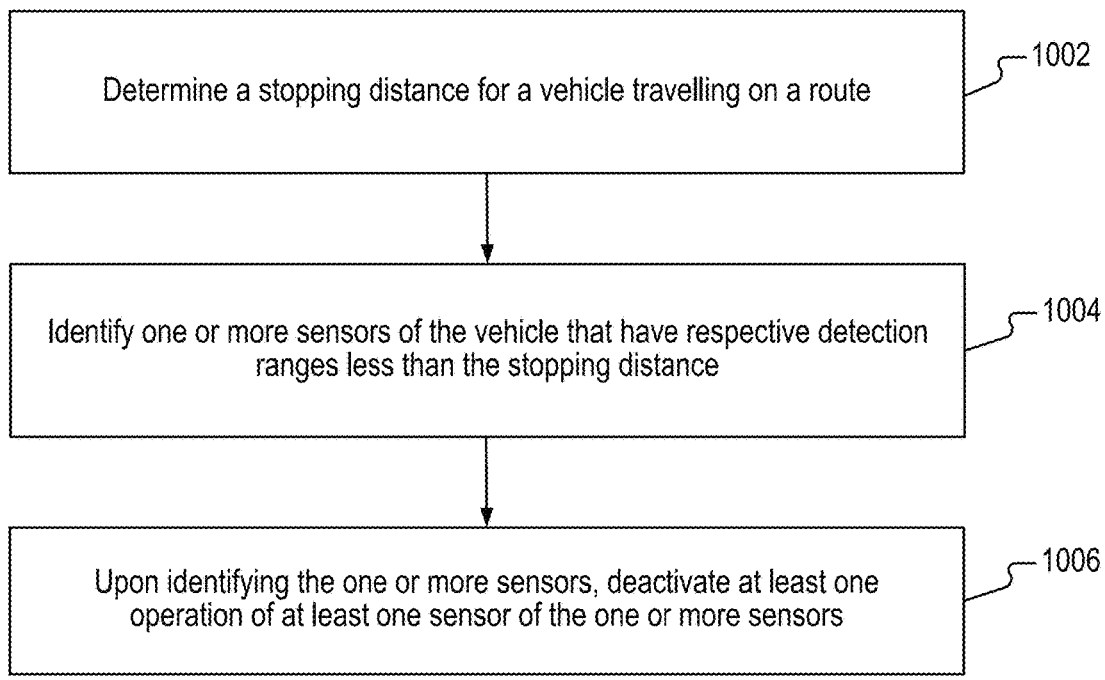
FIG. 10 illustrates a process for managing vehicle sensors for power management.

FIG. 10 illustrates a process 1000 for implementing vehicle sensor management during an operation of a vehicle having autonomous driving systems, in accordance with one or more embodiments. In some embodiments, the process 1000 is performed (e.g., completely, partially, and/or the like) by the autonomous system 202 of the vehicle 200 as shown in FIG. 2. Additionally, or alternatively, in some embodiments, the process 1000 is performed (e.g., completely, partially, and/or the like) by another device or group of devices separate from or including the autonomous system, e.g., the remote AV system 114 as shown in FIG. 1. The autonomous system includes a control system (e.g., the control system 408 shown in FIG. 2). The control system includes a controller (e.g., the controller 702 shown in FIGS. 7 and 8A). The controller can include a power management module (e.g., the module 820 of FIGS. 8A and 8B). Likewise, embodiments may include different and/or additional operations, or perform the process operations in a different order.

As shown in FIG. 10, the process 1000 starts with autonomous system determining a stopping distance for the vehicle travelling on a route (1002). For example, the autonomous system determines the stopping distance for the vehicle using at least one of a driving speed of the vehicle, one or more deceleration parameters, or one or more timing parameters. The autonomous system can obtain the driving speed of the vehicle from an output of a speed sensor. In one embodiment, the autonomous system determines the stopping distance using at least a braking mechanism, e.g., an emergency braking mechanism or a comfort braking mechanism. The autonomous system can analyze an environment of the vehicle on the route, e.g., by outputs of vehicle sensors, and choose which braking mechanism to determine the stopping distance.

The process 1000 continues with the autonomous system identifying one or more sensors of the vehicle that have respective detection ranges less than the stopping distance for the vehicle (1004). For example, the autonomous system identifies one or more short-range sensors of the vehicle with detection range(s) less than the determined stopping distance. In some cases, the autonomous system also identifies one or more long-range sensors of the vehicle with detection range(s) equal to or greater than the determined stopping distance. As illustrated in FIG. 9, each sensor has a respective detection range, e.g., $D_{SR}$ for a short range sensor or $D_{LR}$ for a long range sensor. The one or more short-range sensors can include at least one of a Light Detection and Ranging (LiDAR) sensor, a Radio Detection and Ranging (RADAR) sensor, a microphone sensor, or a camera sensor.

In some embodiments, the autonomous system determines whether a driving speed of the vehicle travelling on the route is greater than a speed threshold (e.g., 40 mph), and identifies the one or more sensors of the vehicle in response to determining that the driving speed of the vehicle is greater than the speed threshold. For example, the autonomous system identifies the one or more sensors for smart power management in response to determining that the vehicle is at a high speed operation, e.g., driving on a highway road.

With continued reference to the process 1000, upon identifying the one or more sensors, the autonomous system deactivates at least one operation of at least one sensor of the one or more sensors (1006). In one embodiment, the autonomous system determines a deactivation distance threshold, e.g., $D_{Deactivate}$ as shown in FIG. 9, of the at least one sensor, which is greater than a respective detection range of the at least one sensor (e.g., for adding some buffering time or distance for deactivating). The autonomous system then determines whether the stopping distance for the vehicle is greater than the deactivation distance threshold of the at least one sensor. The autonomous system deactivates the at least an operation of the at least one sensor in response to determining that the stopping distance of the vehicle is greater than the deactivation distance threshold of the at least one sensor.

The control system can partially or completely deactivate a short-range sensor based on one or more characteristics of the short-range sensor (e.g., priority, rear/front facing, startup time, active/passive).

In one embodiment, the autonomous system deactivates the at least one operation of the at least one sensor of the one or more sensors by ceasing provision of computing power to one or more components of the at least one sensor.

In one embodiment, the autonomous system determines whether the at least one sensor is a passive device or an active device and chooses to completely deactivate the at least one sensor in response to determining that the at least one sensor is a passive device or to partially deactivate the at least one sensor in response to determining that the at least one sensor is an active device, e.g., shutting off a power supply for laser firing of a LiDAR sensor but still running CPU and FPGAs.

In one embodiment, the autonomous system determines whether the at least one sensor is a low-priority sensor or a high-priority sensor and chooses to completely deactivate the at least one sensor in response to determining that the at least one sensor is a low-priority sensor or to partially deactivate the at least one sensor in response to determining that the at least one sensor is a high-priority sensor.

In one embodiment, the autonomous system determines whether a startup time of the at least one sensor is less than a time threshold and chooses to completely deactivate the at least one sensor in response to determining that the startup time of the at least one sensor is less than the time threshold, or partially deactivate the at least one sensor in response to determining that the startup time of the at least one sensor is equal to or greater than the time threshold.

The autonomous system dynamically updates a stopping distance during the vehicle travels on the route. In one embodiment, at a time subsequent to deactivating the at least one operation of the at least one sensor, the autonomous system determines a current stopping distance for the vehicle traveling on the route. The autonomous system determines whether the current stopping distance for the vehicle is less than an activation distance threshold (e.g., $D_{Activate}$ as shown in FIG. 9) of the at least one sensor. The activation distance threshold can be greater than the detection range of the sensor (e.g., to add some buffering time or distance for reactivating). In response to determining that the current stopping distance of the vehicle is less than the activation distance threshold of the at least one sensor, the autonomous system can reactivate the at least one sensor for operation. In one embodiment, the activation distance threshold is less than the deactivation distance threshold. In such a way, the autonomous system can control the sensor to deactivate later and reactivate earlier for operation, which can effectively add buffering time or distance for operation.

In one embodiment, the autonomous system determines whether a current driving speed of the vehicle is less than a speed threshold (e.g., 40 mph). The controller can reactivate the at least one sensor for operation in response to determining that the driving speed of the vehicle is less than the speed threshold, e.g., the vehicle switches to low speed operation or drives at a local road.

In one embodiment, when a sensor is reactivated, the autonomous system tracks when was the last reactivation for the sensor. The autonomous system can decide to deactivate the sensor if a time period elapsed since the last reactivation is greater than a particular time threshold. In this way, the autonomous system can add a time hysteresis feature for the sensor to avoid ping-ponging on-off states, which can be used in addition, or as an alternative to, a buffering time or distance.

The autonomous system can also identify one or more sensors (e.g., long-range sensors) that have a detection range greater than the stopping distance for the vehicle. Each of the one or more sensors includes at least one of a LiDAR sensor, a RADAR sensor, a microphone sensor, or a camera sensor. In one example, the autonomous system determines that a detection range of a second sensor is greater than the stopping distance and maintain an operation of the second sensor. The autonomous system can maintain the operation of the second sensor in response to determining that a driving speed of the vehicle is beyond a speed threshold.

In one embodiment, at a time subsequent to deactivating the at least one operation of the at least one sensor, the autonomous system allocates a particular amount of computing power to the second sensor. The particular amount of computing power is greater than an initial amount of computing power provided to the second sensor when the at least one sensor is activated and in operation.

In one embodiment, the autonomous system prioritizes a number of vehicles sensors in operation (e.g., long-range sensors and/or short-range sensors) for energy/computing resources. The autonomous system can reassign the energy/computing resources using priority levels of the sensors in operation. For example, the second sensor can be assigned more computing power if the second sensor has a higher priority than one or more other sensors.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
   determining, using at least one processor, a stopping distance for a vehicle travelling on a route using at least one of a driving speed of the vehicle, one or more deceleration parameters, one or more timing parameters, or at least one braking mechanism;
   identifying, using the at least one processor, one or more sensors of the vehicle that have respective detection ranges less than the stopping distance;
   upon identifying the one or more sensors, deactivating, using the at least one processor, at least one operation of at least one sensor of the one or more sensors;
   at a time subsequent to deactivating the at least one operation of the at least one sensor, determining a current stopping distance for the vehicle traveling on the route;
   determining, using the at least one processor, whether the current stopping distance for the vehicle is less than an activation distance threshold of the at least one sensor, wherein the activation distance threshold is greater than the detection range of the at least one sensor; and in response to determining that the current stopping distance of the vehicle is less than the activation distance threshold of the at least one sensor, reactivating the at least one sensor for operation.

2. The method of claim 1, wherein identifying the one or more sensors comprises:
determining, using the at least one processor, whether the driving speed of the vehicle is greater than a speed threshold; and
identifying the one or more sensors of the vehicle in response to determining that the driving speed of the vehicle is greater than the speed threshold.

3. The method of claim 2, comprising:
analyzing an environment of the vehicle on the route;
selecting a braking mechanism to determine the stopping distance; and
determining the stopping distance using the braking mechanism.

4. The method of claim 1, wherein deactivating the at least one operation of the at least one sensor of the one or more sensors comprises:
determining a deactivation distance threshold of the at least one sensor, wherein the deactivation distance threshold is greater than a respective detection range of the at least one sensor;
determining, using the at least one processor, whether the stopping distance for the vehicle is greater than the deactivation distance threshold of the at least one sensor; and
deactivating the at least one operation of the at least one sensor in response to determining that the stopping distance of the vehicle is greater than the deactivation distance threshold of the at least one sensor.

5. The method of claim 1, wherein the activation distance threshold is less than a deactivation distance threshold for deactivating the at least one operation of the at least one sensor.

6. The method of claim 1, comprising:
determining, using the at least one processor, whether the driving speed of the vehicle travelling on the route is less than a speed threshold; and
reactivating the at least one sensor for operation in response to determining that the driving speed of the vehicle is less than the speed threshold.

7. The method of claim 1, wherein deactivating the at least one operation of the at least one sensor of the one or more sensors comprises:
ceasing provision of computing power to one or more components of the at least one sensor.

8. The method of claim 1, further comprising: determining whether the at least one sensor is a passive device or an active device,
wherein deactivating the at least one operation of the at least one sensor of the one or more sensors comprises one of:
completely deactivating the at least one sensor in response to determining that the at least one sensor is a passive device, or
partially deactivating the at least one sensor in response to determining that the at least one sensor is an active device.

9. The method of claim 1, further comprising: determining whether the at least one sensor is a rear facing sensor or a front facing sensor,
wherein deactivating the at least one operation of the at least one sensor of the one or more sensors comprises:
deactivating the at least one sensor in response to determining that the at least one sensor is a read facing sensor and that the vehicle is driving forward.

10. The method of claim 1, further comprising: determining whether the at least one sensor is a low-priority sensor or a high-priority sensor,
wherein deactivating the at least one operation of the at least one sensor of the one or more sensors comprises one of:
completely deactivating the at least one sensor in response to determining that the at least one sensor is a low-priority sensor, or
partially deactivating the at least one sensor in response to determining that the at least one sensor is a high-priority sensor.

11. The method of claim 1, further comprising: determining whether a startup time of the at least one sensor is less than a time threshold,
wherein deactivating the at least one operation of the at least one sensor of the one or more sensors comprises one of:
completely deactivating the at least one sensor in response to determining that the startup time of the at least one sensor is less than the time threshold, or
partially deactivating the at least one sensor in response to determining that the startup time of the at least one sensor is equal to or greater than the time threshold.

12. The method of claim 1, wherein the one or more sensors comprise at least one of a Light Detection and Ranging (LiDAR) sensor, a Radio Detection and Ranging (RADAR) sensor, a microphone sensor, or a camera sensor.

13. The method of claim 1, further comprising:
determining, using the at least one processor, that a detection range of a second sensor is greater than the stopping distance; and
maintaining, using the at least one processor, an operation of the second sensor.

14. The method of claim 13, wherein maintaining the operation of the second sensor is in response to determining that the driving speed of the vehicle is beyond a speed threshold.

15. The method of claim 13, wherein the second sensor comprises at least one of a Light Detection and Ranging (LiDAR) sensor, a Radio Detection and Ranging (RADAR) sensor, a microphone sensor, or a camera sensor.

16. The method of claim 1, further comprising:
at a time subsequent to deactivating the at least one operation of the at least one sensor, allocating, using the at least one processor, a particular amount of computing power for a second sensor having a detection range that is greater than the stopping distance,
wherein the particular amount of computing power is greater than an initial amount of computing power provided for the second sensor when the at least one sensor is activated.

17. The method of claim 16, further comprising:
prioritizing a plurality of sensors for computing resources,
wherein the second sensor has a higher priority than one or more other sensors of the plurality of sensors.

18. A system comprising:
at least one processor, and
at least one non-transitory storage medium storing instructions that, when executed by the at least one processor, cause the at least one processor to perform operations comprising:

determining a stopping distance for a vehicle travelling on a route using at least one of a driving speed of the vehicle, one or more deceleration parameters, one or more timing parameters, or at least one braking mechanism;

identifying one or more sensors of the vehicle that have respective detection ranges less than the stopping distance;

upon identifying the one or more sensors, deactivating at least one operation of at least one sensor of the one or more sensors;

at a time subsequent to deactivating the at least one operation of the at least one sensor, determining a current stopping distance for the vehicle traveling on the route;

determining whether the current stopping distance for the vehicle is less than an activation distance threshold of the at least one sensor, wherein the activation distance threshold is greater than the detection range of the at least one sensor; and in response to determining that the current stopping distance of the vehicle is less than the activation distance threshold of the at least one sensor, reactivating the at least one sensor for operation.

19. The system of claim 18, wherein deactivating the at least one operation of the at least one sensor of the one or more sensors comprises:

determining a deactivation distance threshold of the at least one sensor, wherein the deactivation distance threshold is greater than a respective detection range of the at least one sensor;

determining, using the at least one processor, whether the stopping distance for the vehicle is greater than the deactivation distance threshold of the at least one sensor; and deactivating the at least one operation of the at least one sensor in response to determining that the stopping distance of the vehicle is greater than the deactivation distance threshold of the at least one sensor.

20. At least one non-transitory storage medium storing instructions that, when executed by at least one processor, cause the at least one processor to perform operations comprising:

determining a stopping distance for a vehicle travelling on a route;

identifying one or more sensors of the vehicle that have respective detection ranges less than the stopping distance, wherein identifying the one or more sensors comprises: determining whether a driving speed of the vehicle travelling on the route is greater than a speed threshold, and identifying the one or more sensors of the vehicle in response to determining that the driving speed of the vehicle is greater than the speed threshold;

deactivating at least one operation of at least one sensor of the one or more sensors by at least one of:

determining a deactivation distance threshold of the at least one sensor, the deactivation distance threshold being greater than a respective detection range of the at least one sensor; determining whether the stopping distance for the vehicle is greater than the deactivation distance threshold of the at least one sensor; and deactivating the at least an operation of the at least one sensor in response to determining that the stopping distance of the vehicle is greater than the deactivation distance threshold of the at least one sensor;

determining whether the at least one sensor is a passive device or an active device; and completely deactivating the at least one sensor in response to determining that the at least one sensor is a passive device, or partially deactivating the at least one sensor in response to determining that the at least one sensor is an active device;

determining whether the at least one sensor is a rear facing sensor or a front facing sensor; and deactivating the at least one sensor in response to determining that the at least one sensor is a read facing sensor and that the vehicle is driving forward; or determining whether a startup time of the at least one sensor is less than a time threshold; and completely deactivating the at least one sensor in response to determining that the startup time of the at least one sensor is less than the time threshold or partially deactivating the at least one sensor in response to determining that the startup time of the at least one sensor is equal to or greater than the time threshold;

at a time subsequent to deactivating the at least one operation of the at least one sensor, allocating a particular amount of computing power for a second sensor having a detection range that is greater than the stopping distance, wherein the particular amount of computing power is greater than an initial amount of computing power provided for the second sensor when the at least one sensor is activated; and maintaining an operation of the second sensor while the detection range of the second sensor is greater than the stopping distance; and at another time subsequent to deactivating the at least one operation of the at least one sensor, determining a current stopping distance for the vehicle traveling on the route; determining whether the current stopping distance for the vehicle is less than an activation distance threshold of the at least one sensor, wherein the activation distance threshold is greater than the detection range of the at least one sensor; and in response to determining that the current stopping distance of the vehicle is less than the activation distance threshold of the at least one sensor, reactivating the at least one sensor for operation.

* * * * *